United States Patent Office 3,198,016
Patented Aug. 3, 1965

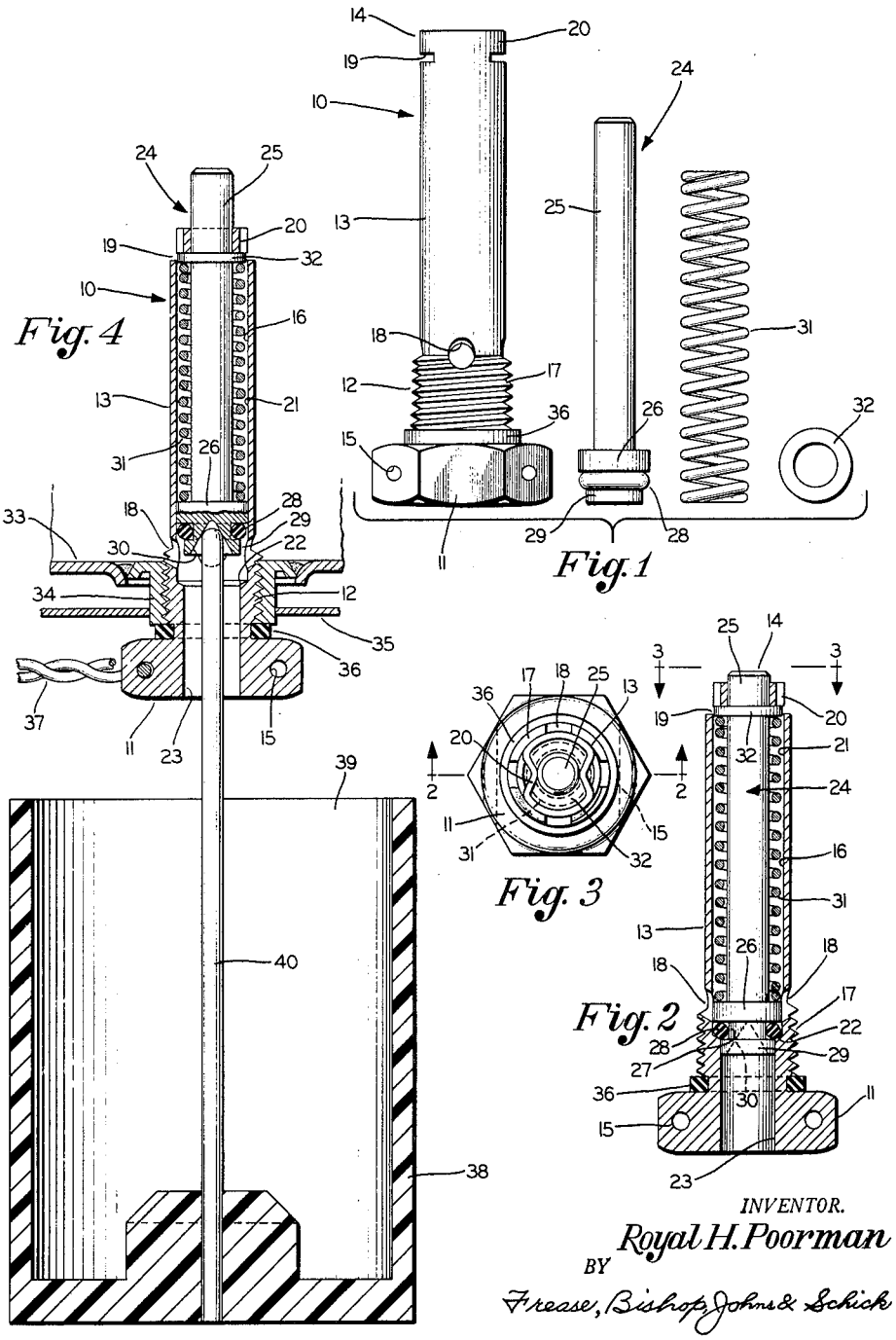

3,198,016
HAND-HELD DRAIN VALVE OPERATING
RECEPTACLE
Royal H. Poorman, 909 12th St. NW., Canton, Ohio
Continuation of application Ser. No. 823,964, June 30, 1959. This application Mar. 8, 1962, Ser. No. 180,921
1 Claim. (Cl. 73—421)

My invention relates generally to a valve construction preferably for use in sampling fuel in or flushing fuel from fuel tanks, and to a unique and convenient method for accomplishing the sampling or flushing operations. More specifically, my invention relates to a particular form of valve construction, preferably for fuel tanks, usable in combination with a particular form of receptacle for easily and conveniently obtaining inspection samples of the fuel at the bottom portion of the fuel tank, or for flushing foreign materials, such as water and sediment, from the bottom portion of the tank. Further, this application is a continuation of my co-pending application, Serial No. 823,964, filed June 30, 1959, now abandoned.

It is common knowledge that it is impossible to maintain fuel for use in various forms of engines from becoming contaminated by foreign matter accidentally entering the fuel tank, and this foreign matter may take the form of dirt and water. It is, of course, impossible to keep certain amounts of water out of the fuel even though the fuel is maintained finely strained at all times, since changing temperature conditions will cause condensation of water from the air contained in partially filled fuel tanks so that this slight water condition is always present.

This problem becomes particularly serious in aircraft in view of the fact that sediment and water can cause malfunction of an engine and possibly result in serious accidents. Also, certain of these same problems are created in the engines of various forms of land vehicles, such as automobiles and the like, but, of course, in this case the consequences are not quite so serious.

In view of the seriousness of the problem in aircraft, it has been common practice for some time to inspect the fuel in the tanks or fuel cells of aircraft by removal of the common drain plug provided in the lower portion of such tanks or cells. Since the fuel tanks of the aircraft are normally in the wings thereof, this results in the necessity of removing the drain plug of the tank and having the fuel spray over various portions of the craft as well as the person conducting the fuel inspection.

In an attempt to rectify this problem, certain of the common drain plugs in the fuel tanks have been removed and replaced by a form of spring-loaded valve with which, by pressing upwardly on certain protruding portions of the valve, it is possible to release only small quantities of the fuel. Even this procedure, however, is objectionable, since the quantity of the fuel released can still spray over portions of the aircraft and the person conducting the inspection, particularly where wind conditions are involved.

A still further objection to these prior valve constructions is that when the valves are installed in the lower portions of the aircraft fuel tanks, considerable portions of the valves project below the lower surfaces of the wings in which the tanks are mounted. This results in the problem, particularly in small aircraft, of the valves interfering with the doors of the aircraft, and this also presents the danger of someone striking the valves and accidentally releasing or damaging the same.

It is, therefore, a general object of the present invention to provide a valve construction and method for operating the same which eliminates the foregoing problems and solves the stated difficulties.

It is a primary object of the present invention to provide a valve construction which is relatively simple, yet is efficient and positive in use and, therefore, may be used in fuel tanks where highly volatile liquids are involved.

It is a further object of the present invention to provide a valve construction for use in fuel tanks in which the major portion of the valve is telescoped inwardly into the lower portion of the tank so that a no greater portion projects from the tank than has been previously provided by common fuel tank drain plugs.

It is still a further object of the present invention to provide a valve construction which is formed in a unique manner for convenient assembly and, therefore, may be provided at a minimum of cost.

It is an additional object of the present invention to provide a valve construction particularly formed for use in combination with a particular form of fuel receptacle, so that the fuel removed from the tank through the valve construction is received in the receptacle and cannot spray into unwanted areas.

It is also an object of the present invention to provide a valve construction in combination with a particular form of valve releasing receptacle whereby the valve cannot be accidentally released and can be released only by a predetermined use of the receptacle.

Finally, it is an object of the present invention to provide a method of sampling fuel in or flushing fuel from fuel tanks by use of a unique form of valve and fuel receptacle, whereby the sampling or flushing is perfectly controlled and the fuel received may be conveniently visually inspected.

These and other objects are accomplished by the parts, constructions, arrangements, combinations, sub-combinations and methods comprising the present invention, the nature of which is set forth in the following general statement, preferred embodiments and forms of which—illustrative of the best mode in which applicant has contemplated applying the principles—are set forth in the following description and illustrated in the accompanying drawings, and which are particularly and distinctly pointed out and set forth in the appended claim forming a part hereof.

In general terms the valve construction comprising the present invention may be stated as including a tubular valve body having an opening formed longitudinally or vertically therethrough, with fastening means formed on the valve body for securing the valve body preferably extending generally vertically through and into the lower portion of a fuel tank. The valve body is also provided with drain means longitudinally inwardly or vertically upwardly of the fastening means and communicating between the body opening and the inner confines of the fuel tank.

Further, the valve construction includes a valve stem telescoped within the valve body and having a lower portion with sealing means formed thereon normally retained engaged with an annular valve seat in the body opening longitudinally outwardly or vertically downwardly of the drain means, thereby normally sealing the communication of the drain means from the fuel tank through the body opening. Spring means is preferably telescoped over the valve stem within the body opening for resiliently urging the valve stem longitudinally outwardly or vertically downwardly to sealing position, but permitting selective longitudinal inward or vertical upward movement of the valve stem for opening the communication of the drain means from the fuel tank through and longitudinally outward or vertically downward of the body opening.

A retaining washer is preferably mounted reciprocally receiving the inner end of the valve stem and telescoped within the inner end of the valve body, with this retaining washer abutting the inner or vertically upward end of the spring means and maintaining the spring means compressed for urging the valve stem longitudinally outwardly vertically downwardly into sealing position. This retaining washer also acts as a guide for the reciprocal movement of the valve stem during the operation of the valve construction.

The present invention further includes the combination of the foregoing valve construction with a fuel receptacle in the form of a generally tubular receptacle closed at one end and open at the other end, and having a valve release member mounted therein and projecting from the open end thereof. This valve release member is of a smaller cross-sectional size than the longitudinal outward or vertical downward portion of the valve body opening and may be received within the body opening against the outer or lower portion of the valve stem, whereby longitudinal inward or vertical upward pressure of the release member will urge the valve stem to a position opening the combination from the fuel tank through the drain means into and longitudinally outwardly or vertically downwardly through the body opening and finally into the receptacle.

The present invention further includes the method for sampling fuel in a fuel tank including the steps of providing a drain valve in a lower portion of the fuel tank which is normally resiliently urged to a closed position retaining the fuel within the fuel tank. The method also includes the step of providing an engagement portion on the valve which may be engaged for moving parts of the valve to an open position permitting fuel to drain from the tank downwardly through the valve.

Still further, the method includes the step of providing a fuel receptacle having a release member formed thereon. Finally, the method includes the step of engaging the fuel receptacle release member with the valve engagement portion for moving the valve to open position and receiving fuel from the fuel tank through the valve into the receptacle.

By way of example, embodiments of the valve construction, including the fuel receptacle and method of the present invention are illustrated in the accompanying drawings forming a part hereof, wherein like numerals indicate similar parts throughout the several views and in which:

FIG. 1 is an exploded view of the valve construction showing the various parts thereof in elevation;

FIG. 2, a vertical sectional view, part in elevation, looking in the direction of the arrows 2—2 in FIG. 3, showing the valve construction in assembled and in closed position;

FIG. 3, a top plan view of the valve construction of FIG. 2, looking in the direction of the arrows 3–3 in FIG. 2, and;

FIG. 4, a vertical sectional view, part in elevation, showing the fuel receptacle engaged with the valve construction of FIGS. 1, 2 and 3 with the valve construction in open position.

The preferred embodiment of the valve construction comprising the present invention is shown in the drawings in a form for use preferably on aircraft fuel tanks or cells and is preferred to be mounted in a vertically extending position. It should be understood, however, that the valve construction of the present invention may be advantageously used on many other types of fuel tanks whether for aircraft, land vehicles, or otherwise, and also could be mounted in other positions depending on the particular conditions present, all of which are contemplated within the scope of the present invention.

As shown in FIGS. 1, 2 and 3, the valve construction includes a tubular valve body generally indicated at 10 having a lower tool portion 11, a preferably threaded fastening portion 12, and a cylindrical portion 13, terminating upwardly in a securing portion 14. The entire valve construction may be formed of usual materials, preferably either of a non-corrosive basic metal or plated for deterring corrosion when in contact with the usual fuels contained in fuel tanks or cells.

The tool portion 11 of the valve body 10 forms the lower end of the valve body and is preferably formed of a usual hexagonal nut-like shape for engagement by common tools. Further, the tool portion 11 may be formed with one or more openings 15 preferably horizontally through outer portions thereof for a purpose to be hereinafter described. Finally, the tool portion 11 is provided with a central opening generally vertically therethough forming a part of a main opening 16 extending completely vertically through the tool portion 11, fastening portion 12, cylindrical portion 13 and, prior to assembly, the securing portion 14.

Spaced horizontally inwardly from the outer extremities of the tool portion 11, the fastening portion 12 is preferably formed integrally with this tool portion and extends vertically upwardly therefrom, again continuing the main opening 16 vertically upwardly. This fastening portion 12 is preferably provided with the outer usual threads 17 which extend substantially the entire vertical height of fastening portion 12.

A tubular cylindrical portion 13 is formed integral with the fastening portion 12 and extends vertically upwardly therefrom also continuing the main opening 16 upwardly. Formed at the point of joinder between the fastening portion 12 and tubular cylindrical portion 13 are a series of circumferentially spaced drain means in the form of drain openings 18, formed generally horizontally preferably through a portion of the upper extremities of fastening portion 12 and a portion of the lower extremities of the cylindrical portion 13.

Still further, these drain openings 18 may be slightly downwardly angled as they extend radially inwardly, as best seen in FIGS. 2 and 4, and preferably consist of four in number being equally circumferentially spaced. Finally, these drain openings form a communication from outwardly of the fastening and cylindrical portions 12 and 13 into the main opening 16, again for a purpose to be hereinafter described.

The cylindrical portion 13 terminates vertically upwardly in the securing portion 14 which, prior to assembly of the valve construction, is formed by preferably a pair of diametrically opposed slots 19 which are formed in the upper part of the cylindrical portion 13, with the opposing ends of these slots being circumferentially spaced. This thereby forms a pair of diametrically opposed securing strips 20 at the top part of the cylindrical portion 13 which strips extend vertically between slots 19, being formed thereby, and the extreme upper end of the cylindrical portion 13. Again, the purpose of these securing strips 20 will be hereinafter explained.

As is clearly shown in FIG. 2, the main opening 16 vertically through the valve body 10 is provided of a uniform large-diameter portion 21 vertically downwardly through the entire cylindrical portion 13 including the securing portion 14, that is, prior to the assembly of the valve construction, with this large-diameter portion also extending vertically downwardly partially vertically through the fastening portion 12 to a location spaced downwardly from the drain openings 18. At this point, the main opening 16 preferably angles slightly vertically downwardly and inwardly, thereby forming the downwardly angled annular valve seat 22. Finally, the main opening 16 extends from the valve seat 22 vertically downwardly through the remainder of the fastened portion 12 and completely through the tool portion 11 in a small-diameter portion 23.

A preferably generally cylindrical valve stem is generally indicated at 24 and is best shown in FIGS. 1, 2 and 4. Valve stem 24 is preferably of uniform cylindrical configuration from its upper end vertically downwardly for a major portion of its vertical length, forming the main stem portion 25.

This main stem portion 25 terminates near the lower end of the valve stem 24 in a radially outwardly-extending generally cylindrical guide collar 26, formed preferably integral with stem portion 25. The main stem portion 25 is provided with an outer diameter, a measured amount less than the inner diameter of the large-diameter portion 21 in the main opening 16, with the collar 26 having a diameter only slightly less than large-diameter portion 21 for a sliding fit therein.

Downwardly of the collar 26 the valve stem 24 is formed with an annular sealing ring slot 27 of a diameter preferably slightly less than the diameter of the main stem portion 25 and for receiving the resilient material annular O-ring 28.

Finally, the valve stem 24 terminates vertically downwardly of the sealing ring slot 27 in a cylindrical auxiliary guide portion 29. The guide portion 29 has an outer diameter sufficiently larger than the diameter of the sealing ring slot 27 for retaining the O-ring 28 between this guide portion and the collar 26, and also the diameter of this guide portion 29 is only slightly smaller than the diameter of the small-diameter portion 23 in the main opening 16 of the valve body 10 for being received in a sliding fit therein.

The lower end surface of the valve stem 24 may also be provided with a generally vertically-extending and downwardly-opening conical recess 30 as shown in broken lines in FIG. 2 and full lines in FIG. 4. The purpose of the recess 30 will likewise be hereinafter explained.

Completing the parts of the valve construction, there is also included a compression spring 31 as shown in FIGS. 1, 2 and 4, which spring is generally cylindrical in over-all configuration, having an internal diameter slightly greater than the outer diameter of the main stem portion 25 of valve stem 24 and having an outer diameter slightly less than the inner diameter of the cylindrical portion 13 on valve body 10. Furthermore, the valve construction includes a retaining and guide washer 32 having an internal diameter slightly larger than the main stem portion 25 on valve stem 24 and an external diameter slightly less than the internal diameter of the cylindrical portion 13 of valve body 10, so that this washer may be received over the main stem portion 25 with a slide fit and also may be received in the cylindrical portion 13 with a slide fit.

In assembling the valve construction, the O-ring 28 is received in the sealing ring slot 27 of valve stem 24 and projects radially outwardly, preferably to a lesser diameter than the outer diameter of the guide collar 26 of valve stem 24, but must project radially outwardly to a greater diameter than the guide portion 29. The valve stem 24 is then received downwardly within the cylindrical portion 13 of the valve body 10 with the guide portion 29 of valve stem 24 ultimately being received at the upper end of the small-diameter portion 23 of main opening 16 in the valve body 10.

In this position of the valve stem 24 within the valve body 10, the O-ring 28 is seated on the valve seat 22 of the valve body 10, with the guide portion 29 below the valve seat, the guide collar 26 extending from slightly below the lower edges of drain openings 18 upwardly intermediate these openings, and with the main stem portion 25 extending upwardly within the cylindrical portion 13 and slightly above the upper end of valve body 10.

Next, the compression spring 31 is positioned over the main stem portion 25 of valve stem 24 abutting the guide collar 26 and extending upwardly within the valve body cylindrical portion 13. The retaining and guide washer 32 is then likewise telescoped over the main stem portion 25 of valve stem 24 compressing the spring 31 downwardly until washer 32 is radially aligned with the slots 19 of valve body 10 and is just below the securing strips 20 of this securing portion 14.

At this time, while the retaining and guide washer 32 is maintained in the foregoing position, the securing strips 20 are crimped radially inwardly to the main stem portion 25 of valve stem 24, as best seen in FIGS. 2 and 3. After this crimping operation the main stem portion 25 of valve stem 24 will have at least a sliding fit with the securing strips 20, but the securing strips will overlie portions of the retaining and guide washer 32, thereby maintaining the valve stem 24, compression spring 31, and retaining and guide washer 32 properly assembled within the valve body 10.

Thus, when the valve construction is assembled, unless an outside force is exerted on the valve stem 24, the compression spring 31 will resiliently maintain the O-ring 28 sealed against the valve seat 22 in valve body 10, thereby maintaining a seal between valve stem 24 and valve body 10 sealing off the main opening 16 of valve body 10 below the drain openings 18. Furthermore, by exerting a vertically upward force on the extreme lower end of the valve stem 24, which lower end is accessible through the lower portion of the main opening 16 in valve body 10, the valve stem may be moved vertically upwardly within valve body 10 until the O-ring 28 is at least above the lower edges of the drain openings 18, and the guide portion 29 of valve stem 24 is removed vertically upwardly from the small-diameter portion 23 of main opening 16 in valve body 10. This thereby provides a communication from outward of the valve body cylindrical portion 13 through the drain openings 18, downwardly through the main opening 16 and outwardly below the valve body fastening portion 12.

During this upward movement of the valve stem 24, the compression spring 31 is, of course, being compressed between the guide collar 26 of the valve stem and the retaining and guide washer 32 secured below the securing strips 20 of valve body 10, and thus release of the valve stem will cause the compression spring to quickly again urge the valve stem to its original sealing position in which the O-ring 28 is sealing against the valve seat 22 of the valve body. Furthermore, the compressing spring 31 is provided with a normally extended length sufficient that when this spring is assembled within the valve construction it is at least slightly compressed between the valve stem guide collar 26 and the retaining and guide washer 32, so that even when the valve stem 24 is in its sealing position, as shown in FIG. 2, this valve stem is resiliently urged downwardly causing the O-ring 28 to tightly seal against the valve seat 22 and form a liquid-tight seal between the valve stem and valve body sealing off the main opening 16 downwardly through the valve body.

It should be noted that during the vertical movement of the valve stem 24 within the valve body 10, the valve stem is guided by the guide collar 26 near the lower end of the valve stem and by the retaining and guide washer 32 near the upper end of the valve stem, with guide collar 26 sliding within the cylindrical portion 13 of the valve body and the main stem portion 25 of the valve stem sliding within the retaining and guide washer. Also, when the valve stem 24 is in its sealing position, as shown in FIG. 2, the guide collar 26 extends slightly below the lower edges of the drain openings 18 in the valve body 10 to thereby relieve certain of the fluid pressure through the drain openings into the valve body main opening 16, and in this manner assist the O-ring 28 in its sealing function against the valve seat 22.

Still further, as the valve stem 24 returns from its open position back to sealing position, the final sealing position being shown in FIG. 2, the auxiliary guide portion 29 of the valve stem first enters the small-diameter portion 23 of main opening 16 in valve body 10 while the O-ring 28 is still spaced above the valve seat 22 of the valve body, so that this auxiliary guide portion 29 with its slide fit in this small-diameter portion 23 aids in finally properly guiding the O-ring 28 into its proper sealing relationship with the valve seat 22.

Finally, it should be noted that even when the valve stem 24 is in sealing position, as shown in FIG. 2, the lower end of this valve stem does not project below the lower end of the valve body 10, and although it would be satisfactory when this valve stem is in sealing position to have the lower end of the valve stem even with the lower end of the valve body, it is preferred, in order to conserve material and provide a greater opening, to recess the valve stem a distance above the lower end of the valve body. In order to provide for convenient and proper engagement with the valve stem 24 it is, however, preferred to form a recess such as the conical recess 30 in the lower end of valve stem 24, so that a tool may be engaged in this recess upwardly through the small-diameter portion 23 of the main opening 16 in valve body 10 for moving the valve stem to its open position.

As shown in FIG. 4, the valve construction is installed in a fuel tank or cell 33 of the type used in aircraft. In this position, the fastening portion 12 is threadably received in the tank drain opening 34 with the drain openings 18 in valve body 10 opening into the inner confines of fuel tank 33.

Furthermore, the skin portion of the aircraft wing is shown at 35 and the securing portion 14 of valve body 10 projects therebelow with a sealing washer 36 being provided between the fastening portion 12 and the drain opening 34. Finally, once the valve construction is installed in the fuel tank 33, a wire 37 may be received through one of the openings 15 in the securing portion 14 of valve body 10, with wire 37 being connected to the skin 35 to retain the valve body against rotation once installed.

Again, it should be noted that even when the valve stem 24 is in sealing position, it does not project below the securing portion 14 of valve body 10, but rather the only portion of the valve construction which projects below the skin 35 is securing portion 14. For this reason, when the valve construction of the present invention is installed in a fuel tank 33, the major portion thereof extends within the fuel tank and the securing portion 14, which is the only portion thereof which projects outwardly of the fuel tank, is equivalent in size and projection to the common drain plug normally found in such fuel tanks.

In order to provide for convenient draining, sampling and inspection of the fuel in the fuel tank 33 having the valve construction hereinbefore described, the construction of the present invention includes a receptacle 38 having the usual open upper end 39 and the preferably centrally-located and vertically-extending valve release member 40. With the lower end of the valve stem 24 in the valve construction recessed within the valve body 10, it is usually necessary that the valve release member 40 project vertically above receptacle 38, and this release member must have an outer diameter less than the small-diameter portion 23 of main opening 16 in valve body 10 and also preferably have a diameter less than the maximum diameter of the conical recess 30.

Finally, the receptacle 38 may be of any usual material, preferably resistant to the fuels which may be drained therein, and preferably at least translucent if not transparent so that the fuel drained therein may be properly inspected. The release member 40 may be of any rigid material and for convenience may be a metal rod.

Thus, with the valve construction of the present invention installed in a fuel tank 33 as shown in FIG. 4 and hereinbefore described, the valve construction will normally be retained in a sealed condition. When sealing, the valve stem 24 with the O-ring 28 resiliently held against the valve seat 22 of valve body 10 seals off the communication from within the fuel tank through the drain openings 18 and downwardly through the valve body 10.

When, however, it is desired to obtain a fuel sample, the valve release member 40 of receptacle 38 may be inserted within the small-diameter portion 23 of main opening 16 in valve body 10, as shown in FIG. 4, and the extreme upper end of this valve release member may be received in the conical recess 30 at the lower end of the valve stem 24. By exerting upward pressure on the receptacle 38, the release member 40 will move the valve stem 24 upwardly against the resilient downward urging of the compression spring 31 to the position shown in FIG. 4, wherein communication is provided from the inner confines of fuel tank 33, through drain openings 18, through the small-diameter portion 23 of the main opening 16 in valve body 10, and ultimately downwardly of the securing portion 14 of valve body 10.

Thus, fuel may flow from tank 33 through the valve construction and downwardly into the receptacle 38, and when a sufficient amount has been received in the receptacle, it is merely necessary to move the receptacle downwardly, disengaging the release member 40 from the valve stem 24, and the valve will again quickly close, assuming its sealing position as shown in FIG. 2. Thereafter with the fuel in the receptacle 38 it may be conveniently inspected for water and other contamination.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction and methods illustrated and described herein are by way of example, and the scope of the present invention is not limited to the exact details of the construction shown and methods described.

Having now described the invention, the construction, methods, operation and use of preferred embodiments thereof, and the advantageous, new and useful results obtained thereby; the new and useful construction and reasonable mechanical equivalents thereof obvious to those skilled in the art are set forth in the appended claim.

I claim:

A hand-held drain valve operating receptacle for actuating a drain valve of an aircraft fuel tank to directly receive and visually inspect a sample of fuel from said tank, the drain valve being of the type having a body fastened extending upwardly into the lower portion of an aircraft fuel tank, which body has recessed selectively releasable drain means formed communicating between the interior of the fuel tank and opening downwardly through the fuel tank, and which drain means normally is resiliently urged to closed position closing said communication and is selectively releasable opening said communication through engagement by a pin-like release member engageable with said drain means and urged upwardly from closely below the fuel tank; the operating receptacle comprising an upwardly opening clear plastic cup-shaped member having a tubular upstanding upwardly opening continuous side wall and a closed bottom wall connected to said side wall, a rigid pin-like release member mounted rigidly embedded substantially centrally in the cup-shaped member bottom wall and extending upwardly within and spaced inwardly from upper extremities of the cup-shaped member side wall and terminating spaced above said side wall upper extremities, and the receptacle being constructed of a size for being hand held; whereby, the receptacle may be hand held and adapted to be placed beneath a valve drain means with the rigid release member upwardly engaged with and releasing a drain means, to receive a fuel sample downwardly around said release member into the receptacle within the upwardly opening receptacle side wall, and said fuel sample visually inspected for water and other impurities by viewing through the clear plastic forming said receptacle side wall.

References Cited by the Examiner

UNITED STATES PATENTS

| | | | |
|---|---|---|---|
| 478,698 | 7/92 | King | 251—156 |
| 552,771 | 1/96 | Newhall | 251—156 |
| 2,165,860 | 7/39 | Killmeyer | 222—215 |
| 2,392,501 | 1/46 | Pool | 251—321 |
| 2,489,746 | 11/49 | Buneta | 141—351 X |
| 2,655,932 | 10/53 | Lipman | 251—339 X |
| 2,765,958 | 10/56 | Betts | 222—215 X |
| 2,857,080 | 10/58 | Elias | 222—215 X |
| 3,011,349 | 12/61 | Kratz | 73—421 |
| 3,043,483 | 7/62 | Vogt | 222—215 X |

ISADOR WEIL, *Primary Examiner.*

M. CARY NELSON, CLARENCE R. GORDON,
*Examiners.*